March 31, 1942.   E. G. KESLING   2,277,914
GEAR SHIFTING MECHANISM
Filed March 6, 1940   5 Sheets-Sheet 1

INVENTOR
Elmer G. Kesling

March 31, 1942. E. G. KESLING 2,277,914
GEAR SHIFTING MECHANISM
Filed March 6, 1940 5 Sheets-Sheet 2

INVENTOR
Elmer G. Kesling

March 31, 1942. E. G. KESLING 2,277,914
GEAR SHIFTING MECHANISM
Filed March 6, 1940 5 Sheets-Sheet 3

Fig. 5.

INVENTOR
Elmer G. Kesling

March 31, 1942.  E. G. KESLING  2,277,914
GEAR SHIFTING MECHANISM
Filed March 6, 1940   5 Sheets-Sheet 5

INVENTOR
Elmer G. Kesling

Patented Mar. 31, 1942

2,277,914

UNITED STATES PATENT OFFICE 2,277,914

GEARSHIFTING MECHANISM

Elmer G. Kesling, Bloomfield, Mo.

Application March 6, 1940, Serial No. 322,564

17 Claims. (Cl. 74—335)

This invention relates to gear shifting mechanism, and has special utility as a selecting and shifting means for the transmission gearing of automobiles and other vehicles. The gear shifting mechanism used is of the booster type in which the parts for selective engagement and the valve mechanism are mounted on the steering column and the power means has support on the cowl dash, and in which manual energy is applied to effect the selective movements preparatory for the shifting movements, after which manual and power energy may be applied independently or in combination to effect the shifting movements, and in which manual energy, resilient energy and power energy are utilized to regulate a valve for controlling the power means, and also in which said manual energy may be utilized to effect any desired part of the shifting movements.

Objects of the invention are to provide a simplified remotely controlled booster gear shifting mechanism which includes an operating lever mounted on the steering column just under the steering wheel and operating substantially in a conventional manner, and which includes a selecting means also mounted on the steering column for selectively engaging and operating the connections for effecting the required speed relation; to provide a manual means for effecting selection of the element to be shifted; to provide a power means for effecting the shifting movements of the selected element; to provide a valve mechanism for controlling energization of said power means; to provide mechanism mounted on the steering column for preventing a shifting movement of an unselected element; to provide a construction in which the valve mechanism and the power means are mounted in a position to be protected from the dirt and dust of the road. Other objects will be apparent from the following description, reference being made to the accompanying drawings, in which—

Figure 3:
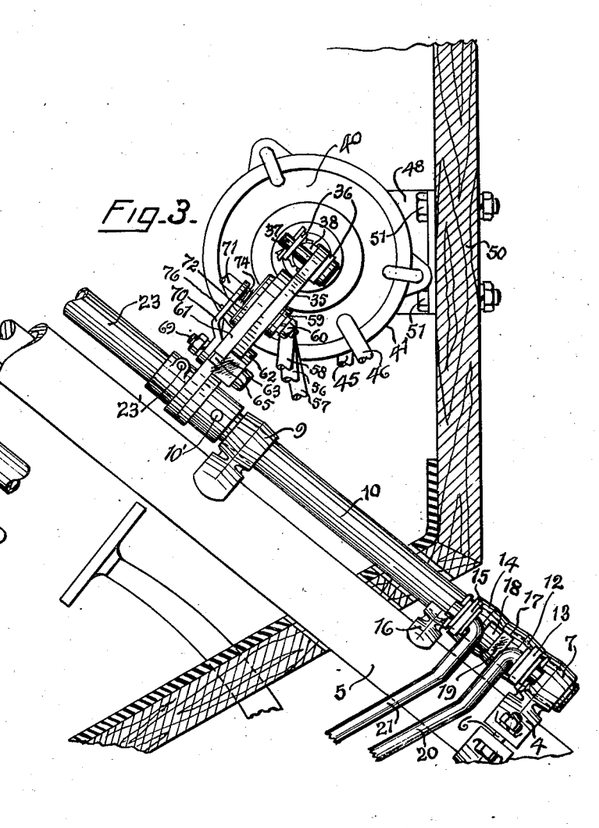
Fig. 3 is a side elevation showing part of one form of my improved gear shifting mechanism mounted on the steering column and on the cowl dash.

The case 1 (Fig. 4) encloses the customary transmission gearing (not shown). The present invention is not concerned with the construction of the gearing that is within the case 1, except that it is to be understood that they are of the type in which a part is moved in one direction by the crank 2 to effect reverse speed relation and in the other direction by said crank 2 to effect low speed relation, and in which another part is moved in one direction by the crank 3 to effect intermediate speed relation and in the other direction by said crank 3 to effect high speed relation. A bracket 4 is adjustably secured to the lower end portion of the steering column 5 by bolts 6 and has a bearing 7 integrally formed therewith (Fig. 3).

A bearing 8 is secured in any known manner to the upper end of the steering column 5.

A bearing 9 is secured to the intermediate portion of the steering column 5 by welding or otherwise.

The bearings 7, 8 and 9 are normally placed in axial alignment.

A tubular shaft 10 is mounted for rocking and longitudinal movements in the bearing 7 and 9. A bar 11 (Fig. 4) is secured in the upper end of the tubular shaft 10 and projects beyond the end of the tubular shaft 10.

A hub 12 of a crank arm 13 is loosely mounted on the shaft 10 against the upper end of the bearing 7. A second hub 14 of a crank arm 15 is loosely mounted on the shaft 10 against the upper end of the hub 12. An abutment 16 cooperating with the bearing 7 for holding the hubs 12 and 14 from endwise movements is secured to the steering column 5 by welding or otherwise. Notches 17 and 18 are formed in the adjacent ends of the respective hubs 12 and 14. A finger 19 is secured to the tubular shaft 10 by welding or otherwise for selective engagement with one or the other of the notches 17 and 18 by longitudinal movements of the shaft 10.

The free ends of the arms 13 and 15 are respectively pivotally connected to one end of links 20 and 21. The other ends of said links 20 and 21 are respectively connected to the arms 3 and 2 by adjustable connections 22.

Figures 1, 2:
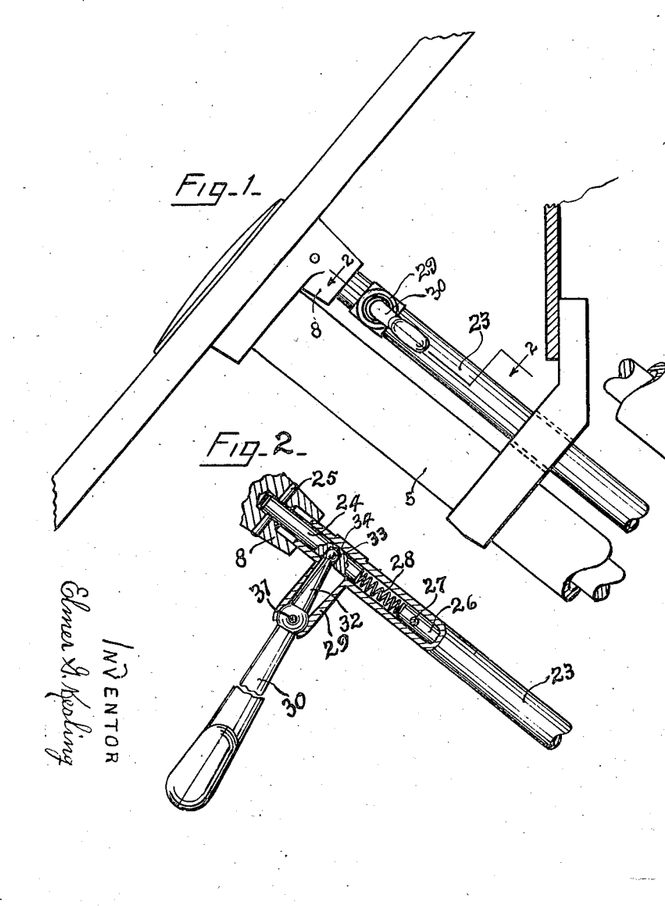
Fig. 1 is a side elevation showing part of the operating parts mounted on the upper end portion of the steering column.
Fig. 2 is a view partly in section approximately on the line 2—2 of Fig. 1.
Figure 5:
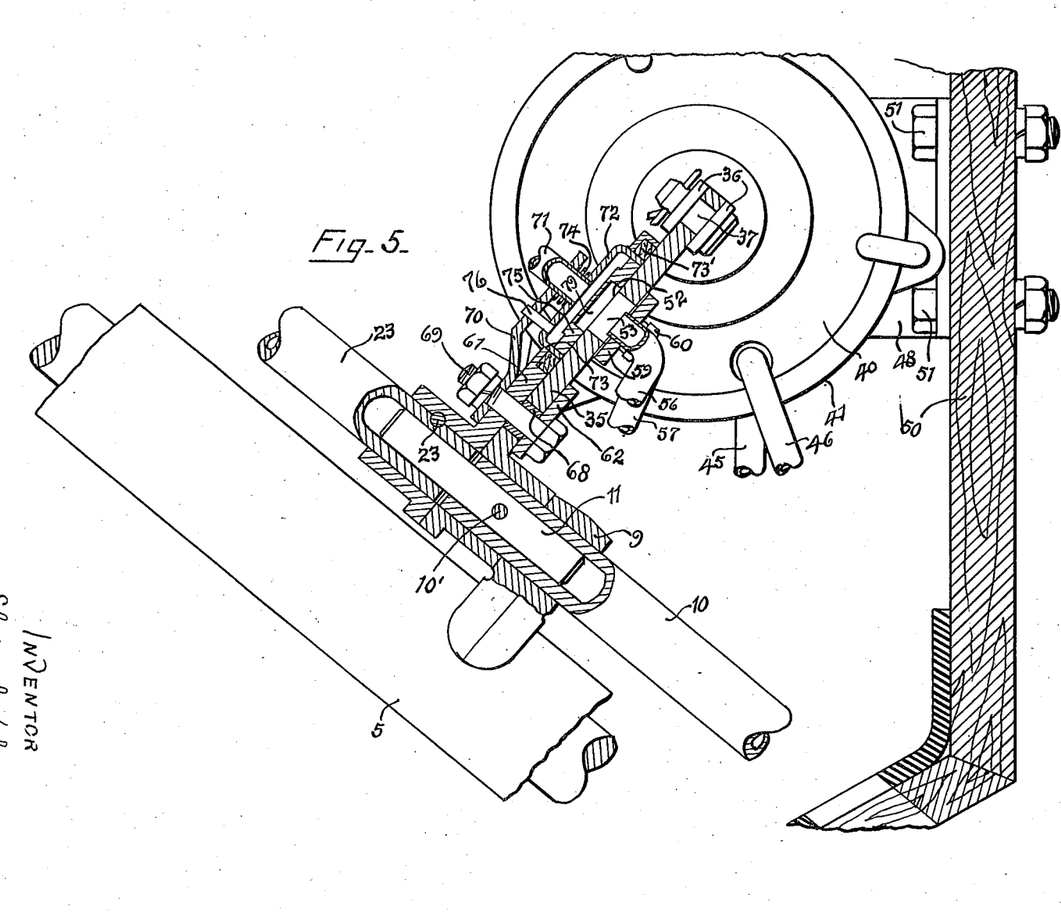
Fig. 5 is an enlarged sectional view approximately on the line 5—5 of Fig. 4.

A second tubular shaft 23 is mounted on the bar 11 and in the bearing 8 (Figs. 2 and 5). One end of a bar 24 is secured in the depth of the bearing 8 by a pin 25 and projects into the adjacent end of the tubular shaft 23. A plug 26 is secured in the tubular shaft 23 at a distance from the bar 24 by a pin 27. A spring 28 is mounted in the tubular shaft 23 between the bar 24 and plug 26 and resiliently holds the shaft 23, etc., in a normally selected downward position.

A tubular projection 29 is secured by welding or otherwise to one side of the upper end of the tubular shaft 23 in line with a hole in the wall of the tubular shaft 23. An operating lever 30 is secured in the projecting end of the projection 29 by a pin 31 and has an inwardly projecting end 32 extending through the tubular projection 29 and terminating in a ball formation 33 which has pivotal bearing in a notch 34 in the adjacent side of the bar 24.

A crank arm 35 is secured by a pin 10′ or otherwise to the projecting end of the shaft 10 beyond the bearing 9. The free end of the arm 35 is pivotally connected to spaced ears 36 by a pin 37, while the ears 36 are secured to one end of a piston rod 38 by a pin 39 or otherwise. The other end of the rod 38 is extended through a bearing in an end wall 40 of a cylinder 41 and into said cylinder and is secured in any known manner to a piston 42 which divides the cylinder 41 into two chambers 43 and 44. Tubes 45 and 46 are secured in the wall of the cylinder 41 and communicate with the chambers 43 and 44, respectively. A pin or bolt 47 is secured to the end wall opposite the wall 40 of the cylinder 41 and affords a pivotal connection to a supporting bracket 48 by the use of a rubber mounting 49. The bracket 48 may be secured to the dash 50 by bolts 51 or to any convenient stationary part of the automobile.

The piston 42, piston rod 38, etc., are to be known as the power device of this invention.

Figures 4, 6, 7, 8, 9:
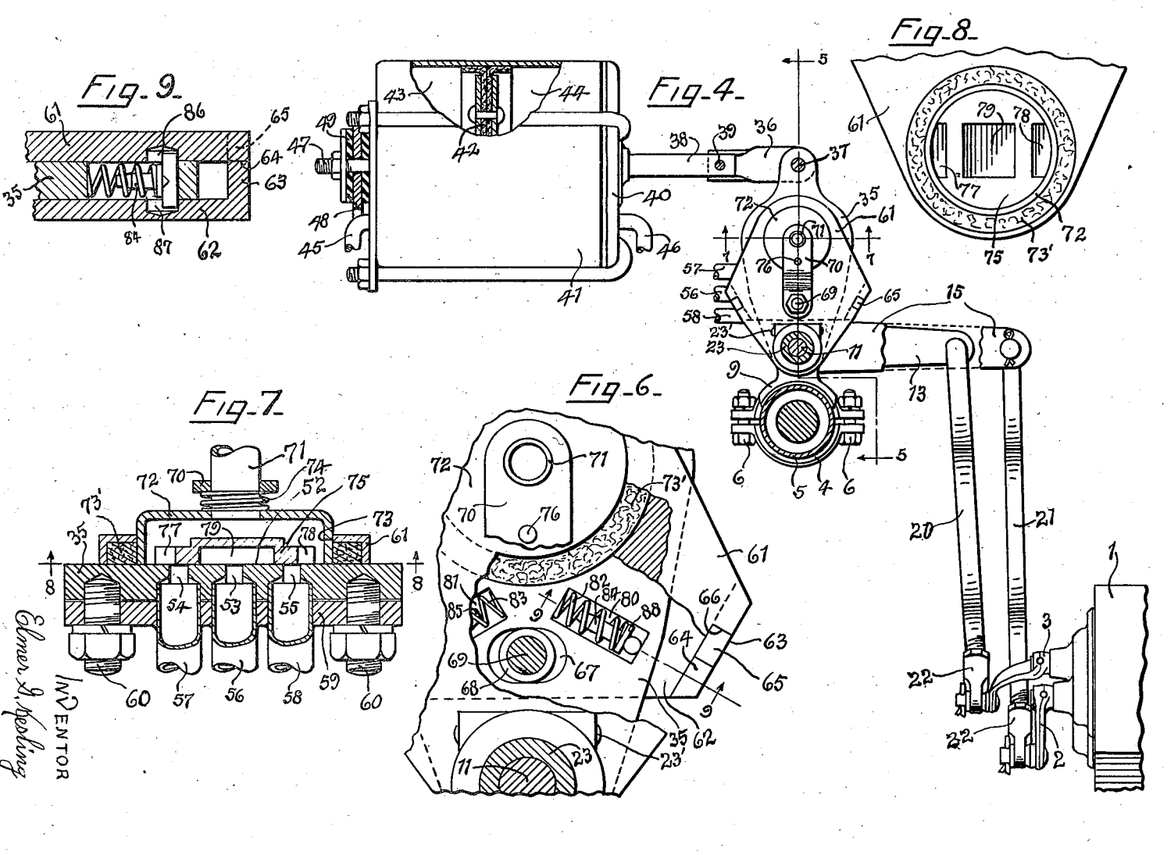
Fig. 4 is a rear elevation of the parts shown in Fig. 3 and showing the connection with the gear case.
Fig. 6 is an enlarged view, partly in section and partly cut-away, of a portion of the mechanism shown in Fig. 4.
Fig. 7 is an enlarged sectional view on the line 7—7 of Fig. 4.
Fig. 8 is a reduced under side view on the line 8—8 of Fig. 7.
Fig. 9 is a sectional view on the line 9—9 of Fig. 6.

A portion of one side of the arm 35 forms a valve seat 52 which has a passage 53 and ports 54 and 55 therethrough (Fig. 7). Tubes 56, 57 and 58 are secured by a plate 59 and bolts 60 to the other side of the arm 35, said tubes 56, 57 and 58 communicate with the passage 53 and ports 54 and 55, respectively.

A crank arm 61 is secured by a pin 23′ or in any other manner to the lower end of the shaft 23. The adjacent surfaces of the arms 35 and 61 are to be parallel for free relative movements therebetween. One or both of the adjacent ends of the hubs of the arms 35 and 61 are to be formed with a slight fullness so as to reduce the surface friction between the arms 35 and 61.

A plate 62 contacting a certain portion of the surface of the arm 35 opposite to the arm 61 has a bent portion 63 at each end which is formed with abutment faces 64 for contacting the adjacent surface of the arm 61 and a projection 65 for snug engagement in a notch 66 formed in the respective edge of the arm 61.

An elongated slot 67 is formed through the arm 35 at a required distance from the shaft 10. A spacing tube 68 is mounted in the slot 67. The arm 61 and plate 62 are held in rigid contact with the respective end of the tube 68 by a bolt 69 which is inserted through the tube 68 and corresponding holes in the arm 61 and plate 62. The tube 68 and the bent portions 63 are of such length to leave the arm 35 free to move between the arm 61 and the plate 62 (Fig. 5). The slot 67, tube and bolt 69 form a lost-motion connection between the arm 61 and the arm 35 for limiting relative rotative movements between the operating shaft 23 and the actuating shaft 10; and the tube 68 and bolt 69 comprises means for simultaneous longitudinal movements of the shafts 10 and 23. The plate 62 is of such length that the bent portion 63 will not be contacted by the arm 61 in the movements permitted by the lost-motion connection 67—69.

A clip 70 is secured at one end to the arm 61 by the bolt 69 and is bent away from the arm 61 and extended into spaced relation with the valve seat 52, and a hole is provided in the free end of the clip 70 through which a tube 71 projects.

A cup-like cover 72 with its edge in contact with the valve seat 52 is mounted in a hole 73 formed in the free end of the arm 61. The inner end of the tube 71 is secured in the dome surface of the cover 72 for communication with the inside thereof. The cover 72 is held in contact with the valve seat 52 by the resiliency of a spring 74 mounted around the tube 71 between the cover 72 and the adjacent surface of the clip 70. A required portion of the hole 73 is enlarged to form a circular recess in the arm 61 for the reception of an oil and dust gasket 73′ of felt or other suitable material. The cover 72 forms a moveable valve chest which both houses and actuates a valve plate 75 which may be spot welded, or otherwise secured, to the cover 72. The cover 72 and plate 75 are prevented from turning in the hole 73 by a pin 76 which is freely mounted in a hole in the clip 70 and secured to the cover 72 by welding or otherwise. The periphery of the valve plate 75 is formed to contact the inner surface of the cover 72 except where it is cut away to form passages 77 and 78 (Figs. 7 and 8) to allow fluid energy to flow between the tube 71 and the port 54 or the port 55, as the case may be. A passage 79 is formed on the under side of the valve plate 75 to allow fluid energy to flow between the passage 53 and the port 54 or the port 55, as the case may be.

The valve seat 52 having passage 53 and ports 54 and 55, and the valve plate 75 together with the cover 72, etc., form the valve mechanism of this invention.

Regulation of the valve mechanism is either effected by turning movements of the shaft 23 which through the arm 61 and the cover 72 causes the valve plate 75 to move relatively to the valve seat 52 or by turning movements of the shaft 10 which through the arm 35 causes the valve seat 52 to move relatively to the valve plate 75. It is then clearly seen that if the shafts 10 and 23 should be held still or turned together any given relative position between the valve 75 and the seat 52 will be maintained.

It can here be noted that the limit of movements of the lost-motion connection 67—69 is such as to allow a complete opening of the valve 75 in either direction.

Rectangular slots 80 and 81 are formed at suitable locations through the arm 35 for the reception of respective valve closing springs 82 and 83 which are reposed on T piece 84 and 85, respectively, with the cross arm of each T piece normally engaging one end wall of the respective slot 80 or 81, and the springs 82 and 83 mounted under a partial compression between the other end wall of said respective slot and the cross arm of said T piece, and with the extended arms of the T piece 84 and 85 projecting into respective holes 86 and 87 provided in the adjacent sides of the arm 61 and the plate 62. The slots 80 and 81 are so placed that the line of action of the springs 82 and 83 is substantially at right angles to the swing pivotal movements of the arms 35 and 61. A washer or integral formation 88, as shown, may be positioned between each T piece 84 and 85 and the respective spring 82 and 83 in order to give the said springs a better abutting surface at that end. The holes 86 and 87 are of such position that the arm 61 and plate 62 normally contact the side of the T piece cross arms opposite the respective springs 82 and 83 and the holes 86 and 87 are of such size that should force be applied in a manner to effect pivotal movements of the arm 61 in either direction the respective T pieces 84 or 85 will be moved to further compress one of the springs 82 or 83, as required, while the other of said springs 82 or 83, as the case may be, will be left in its normally compressed condition. It is clear that should said force be relieved the further compressed spring 82 or 83, as the case may be, will act to automatically return the arms 61 and 35 to normal relative relation. It is also understood that the holes 86 and 87 are of such size to permit the full limits of movements of the lost-motion connection 67—69.

It will be noted that the construction and arrangements of the parts 80 to 88 inclusive, forms an automatic resilient valve closing means, and also a means comprising a definite resilient force for normally holding said valve 75 in a closed relation.

It is now apparent that any swinging movement of the arm 61 from the normal central relation with the arm 35 by a turning movement of the shaft 23 to open the valve 75 will be against the resilient action of the further compressed spring 82 or 83, as the case may be, and that as the force utilized to swing the arm 61 is released the thus further compressed spring 82 or 83 will automatically return the arm 61 to normal relative relation with the arm 35 and thus close the valve 75.

It will be understood that rubber tubing or other flexible means (not shown) is to be used to transmit the fluid energy employed to and from the tubular connections shown. If vacuum air is to be used, such flexible means would connect the tube 56 to the engine intake manifold (not shown), the tube 57 to the tube 45 and the tube 58 to the tube 46, while the tube 71 would simply open to the atmosphere directly or indirectly through an air cleaning device (not shown). If a pressure medium is to be used, the connections of the tubes 57 and 58 to the tubes 45 and 46, respectively, would remain the same as for vacuum air; but the tube 71 would be connected to a pressure device (not shown), while the tube 56 would simply open to the atmosphere directly or indirectly through a muffling device (not shown). This connecting means must be flexible because the connections are to parts that have movement in the operation of the device.

It is to be understood that the customary spring plungers and interlock are utilized in the case 1 for respectively resiliently aiding in positioning and holding the shifter elements into and in a shifted position and preventing an unselected element from being shifted.

In the construction of the modification shown in Figs. 10 to 13, inclusive, the interlock means for preventing shifting movements of the selected element is mounted on the actuating shaft 10; the power means is mounted in front of the dash 50 and connected to the shifting means by a lever separate from the means connecting the shafts 10 and 23; and the spring closing means, although resilient in action, is different in construction from that shown in Figs. 1 to 10.

In the modification the parts 4, 6, 7, and 12 to 18, inclusive, are replaced by parts 4', 6', 7' and 12' to 18', inclusive, respectively.

The brackets 4' and 16' are adjustably secured in spaced relation to the lower end portion of the steering column 5 by screws 6'.

Figures 11, 12, 13:
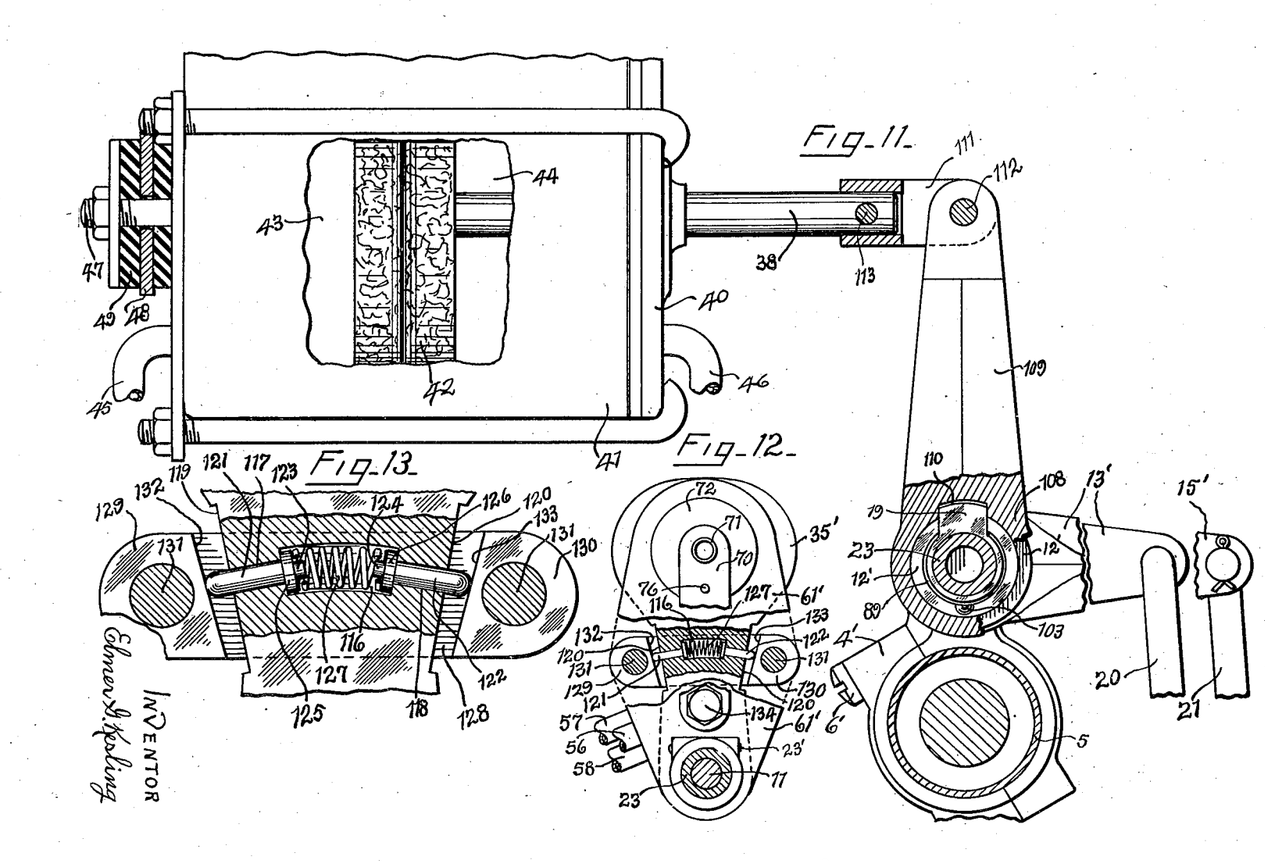
Fig. 11 is a view partly in section approximately on the line 11—11 of Fig. 10.
Fig. 12 is a reduced view partly cut-away and partly in section as viewed from the line 12—12 of Fig. 10.
Fig. 13 is an enlarged view of a part of Fig. 12.

Tubes 89 and 90 are mounted on the shaft 10 on each side, respectively, of the finger 19 and are held from relative longitudinal movements to the shaft 10 by ferrules 91 which are secured to the shaft 10 by pins 92 or otherwise. The tube 89 extends into the bearing 7', and the tube 90 extends into the bearing 93 formed on the upper part of the bracket 16'. The hub 12' of the arm 13' (Fig. 17) is mounted on the tube 89 with one end in contact with the upper end of the bearing 7', and the hub 14' of the arm 15' is mounted on the tube 90 in contact with the other end of the hub 12' and the lower end of the bearing 93. It is clear then that the hubs 12' and 14' are held against longitudinal movements with the shaft 10 by the bearings 7' and 93. Notches 17' and 18' are formed in the adjacent ends of the respective hubs 12' and 14' for selective engagement by the finger 19 by longitudinal movements of the shaft 10. The free end of the arm 13' is connected to the link 21, and the free end of the arm 15' is connected to the link 21 (Fig. 11).

The bearings 7' and 93 and the hubs 12' and 14' have longitudinal grooves 94, 95, 96 and 97 formed in their respective bearing surfaces. Said grooves 94, 95, 96 and 97 are so positioned to be in alignment parallel with the shaft 10 when the hubs 12' and 14' are in neutral position.

The tube 89 has definitely placed and spaced aligned holes 98 and 99 through the wall thereof; and the tube 90 has definitely placed and spaced aligned holes 100 and 101 through the wall thereof. The holes 98, 99, 100 and 101 definitely hold respective balls 102, 103, 104 and 105 for engagement with the respective grooves 94, 95, 96 and 97.

The thickness of the walls of the tubes 89 and 90 and the depth of the grooves 94—97 are such that the balls 102—105 will not have any tendency to roll out of said holes or said grooves in the operation of the device.

Figure 10:
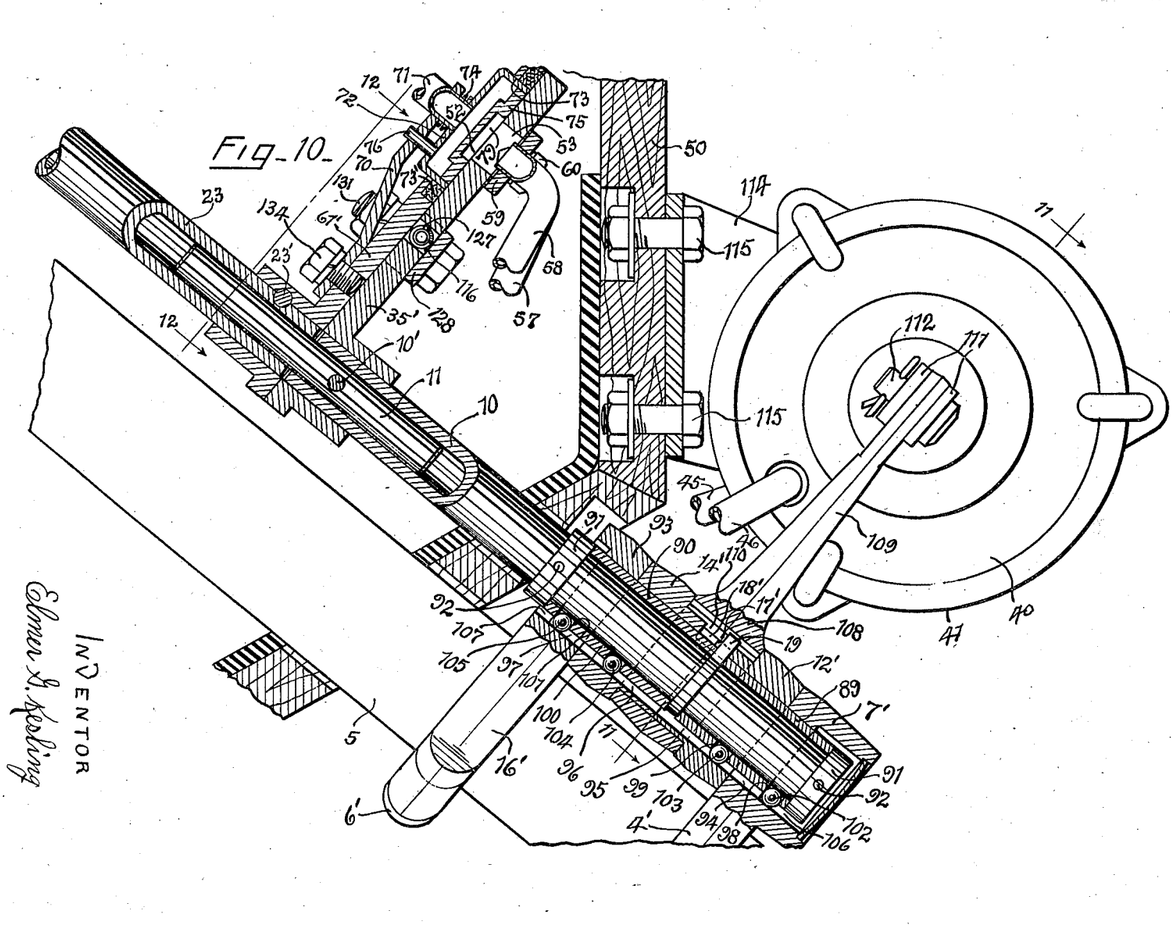
Fig. 10 is an enlarged side elevation, similar to Fig. 3, partly in section of a modified form of the invention.

A circumferential enlargement 106 is formed in the lower end of the bearing 7' by reaming said bearing an amount equal to the depth of the groove 94 and for a sufficient distance so that the ball 102 will be in said enlargement 106 and out of the groove 94 after the shaft has been moved longitudinally for engagement of the finger 19 into the notch 17', which selected position is shown in Fig. 10. A similar enlargement 107 is properly formed in the upper end of the bearing 93 so that the ball 105 will be in said enlargement 107 and out of the groove 97 after the shaft 10 has been moved longitudinally to engage the finger 19 into the notch 18'.

From the foregoing it is plainly seen that the unselected hub 12' or 14' will be held against turning movements, since the respective tube 89 or 90, as the case may be, will be held against turning because the ball 102 or 105 will be locked in the adjacent respective stationary notch 94 or 97, while the selected hub 12' or 14' will be free to turn with the shaft 10 and finger 19, since the respective tube 89 or 90, as the case may be, will also be free to turn, because the ball 102 or 105 will be unlocked from the adjacent stationary notch 94 or 97.

It is noted that the balls 103 and 104 are always locked in the respective notches 95 and 96.

The adjacent ends of the hubs 12' and 14' are turned down to form a bearing surface for the hub 108 of an arm 109. The hub 108 has a groove 110 properly cut in the bearing surface thereof for permanent engagement with the end of the finger 19, therefore any swinging movements of the arm 109 will cause the finger 19, shaft 10, the selected hub 12' or 14', etc., to turn therewith. The free end of the arm 109 is pivotally connected to spaced ears 111 by a pin 112, while the ears 111 are secured to the piston rod 38 by a pin 113 or otherwise.

The piston rod 38, cylinder 41 and all parts relative thereto are the same as shown in Figs. 1 to 9, inclusive, except a bracket 114 connects the cylinder 41 to the front side of the dash 50 by bolts 115 or otherwise.

In the modification (Fig. 10, etc.) the arms 35' and 61' displace the arms 35 and 61, respectively, of the form shown in Figs. 1 to 9.

A single slot 116 substantially rectangular in form is provided through the arm 35'. Said slot 116 is located across the center line of the arm 35' and circularly formed on a suitable radius from the axis of the shafts 10 and 23.

Holes 117 and 118 are drilled substantially on a tangent with the slot 116 from the surface of the formed edges 119 and 120, respectively, of the arm 35' to the adjacent end of the slot 116.

Pins 121 and 122 are mounted for longitudinal movements in the holes 117 and 118, respectively. The pins 121 and 122 have rounded outer ends extending a certain distance from the surfaces 119 and 120, respectively, and reduced inner ends 123 and 124, respectively, extending into the adjacent end of the slot 116. Tight fitting washers 125 and 126 are placed on the reduced ends 123 and 124, respectively.

A spring 127 is mounted under a definite partial compression in the slot 116 between the washers 125 and 126.

A bar 128 is positioned over the slot 116 and across the side of the arm 35' opposite the arm 61'. The ends of the bar 128 are thickened toward the arm 61' to form surfaces 129 and 130 for contacting the adjacent formed edge surfaces 119 and 120 of the arm 61'. Bolts 131 are mounted in aligned holes through the ends of the bar 128 and the arm 61', and the ends of bar 128 are of such thickness that the arm 35' is left free to move between the arm 61' and the bar 128 when the bolts 131 are tight. The sides 132 and 133 of the thickened ends of the bar 128 are so formed and spaced away from the respective edges 119 and 120 as to limit relative turning movements between the arms 35' and 61' and thus between the shafts 23 and 10. Therefore, the surfaces 119 and 120 and the surfaces 132 and 133 act, respectively as a lost-motion connection in the modification shown in Figs. 10 to 13.

The bar 128 and bolts 131 also function to cause the shafts 10 and 23 to always have simultaneous longitudinal movements.

The rounded ends of the projecting pins 121 and 122 normally contact the surfaces 132 and 133, respectively. With this construction it is clear that the spring 127 will be further compressed when the arms 35' and 61' are relatively swung in either direction by the surface 132 or 133 moving the corresponding pin 121 or 122 against the spring 127, and that when and as the force effecting such relative movement is released said spring 127 will automatically act to return said arms 35' and 61' to normal relative relation. Therefore, the single spring 127 functions in the same manner as the pair of springs 82 and 83 in the form of this invention shown in Figs. 1 to 9.

A bolt 134 screwed into a threaded hole in the arm 61' secures the clip 70' to the arm 61'. The clip 70' functions the same as the clip 70 of the form shown in Figs. 1 to 9. All other parts are the same as shown in Figs. 1 to 9.

In the operation of the device, the operating lever 30 is swung on the fulcrum pin 31 to produce a positioning of the finger 19 in either the notch 17 or the slot 18, as the case may be, through the action of the parts 32, 33, 34, 24 (28, 26), 29, 23, 35 (62, 68, 69), and 10. When the lever 30 is raised these parts act in one direction to position the finger 19 in the notch 18 which is the selected position for shifting into reverse or low speed positions; and when the lever is lowered these parts act in the opposite direction to position the finger 19 in the notch 17 which is the selected position for shifting into intermediate or high speed positions. It is to be remembered that the force applied to raise the lever 30 is against the resilient action of the spring 28, and that the lever is normally held in the downward position by said spring 28.

After the required selection has been made, the lever 30 is swung in the opposite or horizontal plane to effect the required shift through the action of the parts 31, 29, 23, 61, 72, 75, the openings 53, 54, 55, 77, 78, the proper tubing, the parts 41, 42, 38, 36, 37, 35, 10, and the selected notch 17 or 18 and respective lever 13 or 15, link 20 or 21 and crank 2 or 3, as the case may be. When the lever 30 is swung forwardly, these parts, etc., act in one direction to swing either the crank 2 or the crank 3 forwardly to effect, respectively, either reverse or intermediate speed position, as the case may be; and when the lever 30 is swung rearwardly these parts, etc., act in an opposite direction to swing either the crank 2 or the crank 3 rearwardly to effect, respectively, either low or high speed position, as the case may be.

Therefore, if it is desired to shift into either reverse or low speed, the lever 30 is raised, and, since the lever 30 fulcrums in this plane of movement on the pin 31 in the projection 29 which is rigid with the shaft 23, and, since the lever 30 extends beyond the fulcrum pin 31 to engage the notch 34 in the stationary bar 24, the shaft 23 and parts 61, 35, 10, 19, etc., are made to move longitudinally upward against the resilient action of the spring 28, and the finger 19 will engage into the notch 18; then if it is desired to shift into reverse speed, the lever 30 is swung forward and cause the projection 29 to swing therewith and rotate the shaft 23 in the same direction and the arm 61 which is rigid with the shaft 23 swings in the same direction, against the resilient action of the spring 82, and moves the cover 72 and valve 75 therewith to open the ports 54 and 55; whereupon, if vacuum energy is used, the air will be depleted from the chamber 43 through tube 45—57, port 54, passage 53, and tube 56; and, thereupon, atmospheric air will rush through the tube 71, port 55, and tube 58—46 into the chamber 44 and move the piston 42 to the left (Fig. 5) in the cylinder 41, and swing the crank arm 35 to the left, causing the shaft 10 and finger 19 to turn in the same direction, and since the finger 19 is engaged in the notch 17 the hub 14 will turn and the arm 15 will swing in the same direction and cause the link 21 to move bodily forward and upward and swing the crank arm 3 therewith to effect the shift into reverse speed position.

It is to be noted that this shifting action has been effected by the power means 42, 38, etc., in a follow-up manner, since manual means 30, etc., has initially moved the valve 75 ahead while the power means has subsequently moved the valve seat 52 in a follow-up manner.

Therefore, it is obvious that this shifting movement continues as the operator continues to move the lever 30, etc., and keeps the valve 75 ahead of the ports 54 and 55, and the acting power means 42, etc., will continue to move the valve seat 52 in the same direction; but, if the operator should release the lever 30, the spring 82 will automatically act to close the valve 75 and the power means 42, etc., would stop; or, if the operator should stop the movement of the lever 30 and stay the valve 75, the acting power means 42, etc., will continue to move the valve seat 52 in a follow-up manner and cause the ports 54 and 55 to over-run the valve 75, whereupon the power means will also stop.

To bring the parts from reverse speed position to neutral position, the parts will act in the opposite direction to that of shifting into reverse speed position, except the other spring 83 will be further compressed as the valve 75 is moved in the opposite direction to open the ports 54 and 55; whereupon the air in the chamber 44 is depleted by said vacuum through the tube 46—58, port 55, passage 53 and tube 56; and thereupon atmospheric air will rush through tube 71, port 54 and tube 57—45 into chamber 43 and move the piston 42 toward the rear of the cylinder 41, and the connected parts, acting in the said opposite direction, effect the shift into neutral position.

The action of shifting from neutral position to low speed position is the same as shifting from reverse speed position to neutral position; and the action of returning the parts to neutral position from low speed position is the same as shifting from neutral position to reverse speed position.

To shift into either intermediate or high speed position, the lever is lowered, normally automatically by the spring 28 when the parts are in neutral position, which movement, whether manual or by said resilient means 28, through the connected parts 32, 33, 34, etc., effects a longitudinally upward movement of the shaft 23, arms 61, 35, shaft 10, etc., and causes the finger 19 to engage into the notch 17; then, if it is desired to shift into intermediate speed position, the lever 30 is swung forwardly and the action of all parts is the same as that to shift into reverse speed position, except the finger 19 having been selectively engaged in the notch 17 of the hub 12, the arm 13 will be made to swing upwardly (Fig. 4) and cause the link 20 to move bodily forward and upward and swing the crank arm 2 therewith to effect the shift into intermediate speed position.

To bring the parts from intermediate speed position to neutral position and to high speed position, all parts move and act in the opposite direction to that of effecting the shift into intermediate speed position; and the action to bring the parts to neutral position from high speed position is the same as that to effect the shift into intermediate speed position.

Selection is always effected manually in the manner described, regardless of whether the shifting movements are to be effected by power means alone, by a combination of power and manual means, or by manual means alone.

The selecting and shifting operations of the modification shown in Figs. 11 to 13 are accomplished in the same manner as in the form shown in Figs. 1 to 10, inclusive, except the power device 42, 39, etc., is operatively connected to finger 19 through the lever 109 whereas in the form shown in Figs. 1 to 9 this connection is through arm 35 and shaft 10; and the cylinder 41 is connected to the other side of the dash 50 in the modification of Figs. 10 to 13.

A decided advantage of the modification shown in Figs. 10 to 13 is that in the modified form the arm 109 has no relative movements with the cylinder 41 during selection and can be mounted rigid in that plane; whereas, in the form of Figs. 1 to 9, the arm 35 has relative movements with the cylinder 41 and extra space must be provided between the ears 36 as shown in Fig. 3, or a mounting flexible in that plane must be provided where closer fitting ears 36 are used as shown in Fig. 5.

Manual action to effect the shift or assist in effecting the shifting is brought about by the tube 68 engaging one or the other of the ends, as the case may be, of the slot 67 of the original disclosure in Figs. 1 to 10, or one or the other of the edge surfaces 119, 120 of the arm 35' engaging either the surface 132 or the surface 133, as the case may be, of the modification shown in Figs. 11 to 13; whereupon a continued manual movement of the lever 30, 23, etc., in the same direction will swing the arm 35 or 35' in the same direction to cause the connected parts 10, etc., to effect the shift selected as disclosed in describing the power shifting movements.

It is obvious that the interlock device 89 to 92 and 94 to 107, inclusive, which has been described herefore could be installed in the form shown in Figs. 1 to 10, inclusive.

It can also be noted that said interlock prevents the selecting finger 19, shaft 10, etc., from being turned except when said finger 19 is completely into engagement with one or the other of the notches 17 or 18.

It must now be apparent that my invention obtains all the intended objects in a highly efficient manner. Obviously, the construction, arrangement and relationship of the parts may be varied within the scope of equivalent limits without departure from the nature and principle of the invention. I do not restrict myself specifically otherwise than as set forth in the appended claims, nor do I restrict myself unessentially in any respects.

I claim:

1. Gear shifting mechanism of the character described comprising a shaft, a second shaft, both of said shafts being mounted for longitudinal and rocking movements, means connecting said shafts for positive simultaneous longitudinal movements and for slight relative rotative movements, a pair of opposite acting springs mounted on a part of said connecting means under a limited expansion, means co-acting with another part of said connecting means for effecting a further compression of one or the other of said springs by said second shaft, a manual means connected to said second shaft for operating said shafts, and a power device controlled by said connecting means for assisting said manual means in operating said first named shaft.

2. Gear shifting mechanism of the character described comprising shifter elements, an actuator mounted for longitudinal selective movements and rotative shifting movements for selectively shifting said elements, a spindle for moving said actuator, means providing a positive longitudinal connection and also providing a lost-motion rotative connection between said spindle and said actuator, resilient means mounted on a part of said connecting means, means co-acting with another part of said connecting means for contacting said resilient means to resiliently hold said shaft and said actuator in a normal central relative rotative relation, manually operated means connected to said spindle for moving said spindle, and a power device connected to said actuator and controlled by said connecting means for assisting said manual means in effecting said shifting movements.

3. Gear shifting mechanism of the character described comprising a shaft, a second shaft, means connecting said shafts for positive simultaneous movements and for limited relative rotative movements, resilient means mounted on said connecting means for resiliently holding said shafts in a normal relative rotative relation, a manual device connected to said second shaft for operating said shafts, and a power means connected to said first named shaft and controlled by said connecting means for assisting said manual device to rotate said first named shaft.

4. Gear shifting mechanism of the character described comprising shifter elements, a pair of shafts mounted in axial alignment for selectively engaging and shifting said elements by longitudinal and rotative movements thereof respectively, connecting means providing positive simultaneous longitudinal movements and limited relative rotative movements of said shafts, resilient means mounted on said connecting means for resiliently holding said shafts in a centrally relative rotative relation, manual means connected to one of said shafts for operating said shafts, and a power device connected to the other one of said shafts and controlled by said connecting means for assisting said manual means to shift the selected element.

5. Gear shifting mechanism of the character described comprising shifter elements, a spindle mounted for longitudinal movements to selectively engage said elements and for rotative movements to shift the selected element, a power device for imparting shifting movements to said spindle, a shaft mounted in axial alignment with said spindle, means connecting said shaft and said spindle providing positive simultaneous longitudinal movements thereof and limited relative rotative movements therebetween, a valve moved by said connecting means for controlling energization of said power device, a resilient means mounted on said connecting means for resiliently holding said valve in a normally closed relation, and manual means for operating said shaft to selectively position said spindle and thereafter regulate said valve and finally to assist said power device to impart shifting movements to said spindle as desired.

6. Gear shifting mechanism of the character described comprising shifter elements, a spindle, an engaging means supported by said spindle for selectively engaging said elements by longitudinal movements of said spindle and for shifting the selected element by rotative movements of said spindle, a power device connected directly with said engaging means for imparting shifting movements to said engaging means, a crank means connected to said spindle, a valve mounted on said crank means and moveable therewith for controlling energization of said power device, and operating means for selectively positioning said engaging means and also regulating said valve.

7. Gear shifting mechanism of the character described comprising a shaft, a second shaft, both of said shafts mounted for longitudinal and rocking movements, means connecting said shafts for positive simultaneous longitudinal movements and for slight relative rotative movements, selective shifter elements loosely mounted on said second shaft, means attached to said second shaft engageable to selectively shift said elements, a manual means connected to said first named shaft for operating said shafts, and a power device directly connected to said engageable means and controlled by said connecting means for imparting shifting movements to said engageable means.

8. Gear shifting mechanism of the character described comprising a pair of shafts mounted in axial alignment for longitudinal and rocking movements, means connecting said shafts for positive simultaneous longitudinal movements and for slight relative rotative movements, selective shifter elements loosely mounted on one of said shafts, a finger attached to said one of said shafts for selectively engaging and shifting said elements, a power device controlled by said connecting means and operatively connected directly to said finger for imparting shifting movements to said finger, and manual means for operating said shafts to selectively position said finger and thereafter operate said connecting means to control said power device and finally assist said power device in imparting shifting movements to said finger.

9. Gear shifting mechanism of the character described comprising a shaft, a spindle, means connecting said shaft and said spindle for simultaneous longitudinal movements and limited relative rotative movements and simultaneous rotative movements, selective shifter elements mounted on said spindle, a finger secured to said spindle for selectively engaging and shifting said elements, a lever loosely mounted on said shifter elements and having permanent engagement with said finger for imparting shifting movements thereto, a power device controlled by said connecting means and connected to said lever for operating the same, and manual operating means for operating said shaft.

10. Gear shifting mechanism of the character described comprising a spindle, selective shifter elements loosely mounted on said spindle, a finger secured to said spindle for selectively engaging and shifting said elements, a lever loosely mounted on said shifter elements and having permanent engagement with said finger for imparting shifting movements to said finger, a power device connected to said lever for operating the same, and manual means for selectively positioning said finger and controlling said power device.

11. Gear shifting mechanism of the character described comprising a spindle, selective shifter elements loosely mounted on said spindle, a finger secured to said spindle for selectively engaging and shifting said elements, a lever loosely mounted on said shifter elements and having permanent engagement with said finger for imparting shifting movements to said finger, a power device connected to said lever for operating the same, and manual means for selectively positioning said finger and also controlling said power device and thereafter assisting said power device in shifting the selected element.

12. Gear shifting mechanism of the character described comprising spaced supports, a shaft mounted for longitudinal and turning movements, a tube loosely mounted in each support and on said shaft, means preventing relative longitudinal movements between said tubes and said shaft, selective shifter elements loosely mounted on said tubes between said supports, a finger secured to said shaft and extending between and beyond said tubes for selectively engaging and shifting said elements, means associated with said tubes and said elements and said supports for preventing shifting movements of the unselected element, and operating means connected to said shaft for operating the same to selectively position said finger and also shift the selected element.

13. Gear shifting mechanism of the character described comprising spaced supports, a shaft mounted for longitudinal and turning movements, a tube loosely mounted in each support and on said shaft, means preventing relative longitudinal movements between said tubes and said shaft, selective shifter elements loosely mounted on said tubes between said supports, a finger secured to said shaft and extending between and beyond said tubes for selectively engaging and shifting said elements, means associated with said tubes and said elements and said supports for preventing shifting movements of the unselected element, and a power device connected to the projecting end of said finger for imparting shifting movements thereto, and manual operating means for selectively positioning said finger and thereafter controlling said power device.

14. Gear shifting mechanism of the character described comprising spaced supports, a shaft mounted for longitudinal and turning movements, a tube loosely mounted in each support and on said shaft, means preventing relative longitudinal movements between said tubes and said shaft, selective shifter elements loosely mounted on said tubes between said supports, a finger secured to said shaft and extending between and beyond said tubes for selectively engaging and shifting said elements, means associated with said tubes and said elements and said supports for preventing shifting movements of the unselected element, a power device connected to the projecting end of said finger for imparting shifting movements thereto, and manual operating means for selectively positioning said finger and thereafter controlling said power device and finally assisting said power device to impart shifting movements to said finger.

15. Gear shifting mechanism of the character described comprising selective shifter elements, a shaft, a spindle, means connecting said shaft and said spindle for simultaneous longitudinal movements and limited relative rotative movements for selecting and shifting said elements, a single spring mounted in said connecting means, means cooperating with said connecting means for compressing said spring one or the other directions when said shaft and said spindle are relatively rotated, and operating means connected to said control shaft for effecting said longitudinal movements and said relative rotative movements, said compression of said spring acting automatically to return said shaft and said spindle to normal relative rotative relation as and when said operating means is released.

16. Gear shifting mechanism of the character described comprising a steering column, a cowel dash, two axially aligned shafts mounted substantially parallel to said steering column for longitudinal and turning movements, elements connecting said shafts for turning and imparting longitudinal movements to one by the other and leaving said shafts free for slight relative turning movements, a manual means connected to one of said shafts for turning and moving the same longitudinally, a power device mounted on said dash and operatively connected to the other one of said shafts for assisting said manual means in turning the same, and a valve operated by said connecting elements controlling energization of said power device.

17. Gear shifting mechanism of the character described comprising spaced supports, a shaft mounted for longitudinal and turning movements, a tube loosely mounted in each support and on said shaft, means preventing relative longitudinal movements between said tubes and said shaft, selective shifter elements loosely mounted on said tubes between said supports, a finger secured to said shaft and extending between and beyond said tubes for selectively engaging and shifting said elements, means associated with said tubes and said elements and said supports for preventing shifting movements of the unselected element, a power device connected to the projecting end of said finger for imparting shifting movements thereto, a second shaft mounted in axial alignment with said first named shaft, means connecting said shafts for simultaneous longitudinal movements and limited relative rotative movements therebetween, a valve mounted on said connecting means, a resilient means, and a manual operating means connected to said second shaft for operating said shafts to selectively position said finger and thereafter regulate said valve against the action of said resilient means to control energization of said power device and finally assist said power device to impart shifting movements to said finger.

ELMER G. KESLING.